United States Patent [19]

McKee et al.

[11] Patent Number: 5,247,022
[45] Date of Patent: Sep. 21, 1993

[54] THERMOPLASTIC MOLDING MATERIAL BASED ON POLYOXYMETHYLENE AND POLYAMIDE

[75] Inventors: Graham E. McKee, Weinheim; Walter Goetz, Ludwigshafen; Siegbert Bohnet, Mannheim; Hartmut Zeiner, Ludwigshafen, all of Fed. Rep. of Germany

[73] Assignee: BASF Aktiengesellschaft, Ludwigshafen, Fed. Rep. of Germany

[21] Appl. No.: 764,871

[22] Filed: Sep. 24, 1991

[30] Foreign Application Priority Data

Sep. 28, 1990 [DE] Fed. Rep. of Germany ....... 4030694

[51] Int. Cl.$^5$ .................. C08G 69/48; C08L 63/00
[52] U.S. Cl. .................. 525/423; 525/405; 525/449; 525/472; 525/523; 525/533; 524/494; 524/495; 524/496
[58] Field of Search ............... 524/500, 494, 495, 496; 525/405, 423, 449, 472, 523, 533

[56] References Cited

U.S. PATENT DOCUMENTS

| 3,406,223 | 10/1968 | Gibbs | 524/249 |
|---|---|---|---|
| 3,480,694 | 11/1969 | Moncure | 524/101 |
| 3,592,873 | 7/1971 | Ishida et al. | 524/342 |
| 4,098,843 | 7/1978 | Johnson | 525/154 |

FOREIGN PATENT DOCUMENTS

| 0047529 | 3/1982 | European Pat. Off. . |
| 0179668 | 4/1986 | European Pat. Off. . |
| 0446737 | 9/1991 | European Pat. Off. . |
| 1197842 | 7/1970 | United Kingdom . |

OTHER PUBLICATIONS

UCAR, Phenoxy Resins, Feb. 26, 1990.
Derwent abstract, JP 61069-859-A; Sep. 1980.

Primary Examiner—Paul R. Michl
Assistant Examiner—John J. Guarriello
Attorney, Agent, or Firm—Keil & Weinkauf

[57] ABSTRACT

A thermoplastic molding material based on
A) from 2 to 97.5% w/w of a homopolymer or copolymer of polyoxymethylene
B) from 2 to 97.5% w/w of a polyamide
C) from 0.5 to 25% w/w of a polycondensate of 2,2-di(4-hydroxyphenyl)propane and epichlorohydrin
D) from 0 to 60% w/w of an impact modifier, and
E) from 0 to 60% w/w of fibrous or particulate fillers or mixtures thereof.

3 Claims, No Drawings

THERMOPLASTIC MOLDING MATERIAL BASED ON POLYOXYMETHYLENE AND POLYAMIDE

The present invention relates to a thermoplastic molding material based on

A) from 2 to 97.5% w/w of a homopolymer or copolymer of polyoxymethylene

B) from 2 to 97.5% w/w of a polyamide

C) from 0.5 to 25% w/w of a polycondensate of 2,2-di(4-hydroxyphenyl)propane and epichlorohydrin D) from 0 to 60% w/w of an impact modifier, and E) from 0 to 60% w/w of fibrous or particulate fillers or mixtures thereof.

The invention further relates to the use of such molding materials for the manufacture of all types of molded articles and to the molded articles thus obtained.

Polyoxymethylene molding materials are useful for a number of thermoplastic applications, particularly for the manufacture of housings and machine parts and for use in the automotive industry.

It is important, in all of such applications, to ensure that the thermal stability of the polymer is adequate, since unstabilized polyoxymethylenes show, under thermal stress, a marked reduction of molecular weight which decreases along the polymer chain as far as the location of a C—C bond in the chain.

Because of this, the polymerization of trioxan or formaldehyde is carried out in admixture with comonomers which introduce C—C bonds into the polymer chain. This does in fact reduce the thermal degradation of polyoxymethylenes, but further improvement in this respect is desirable.

A number of publications discloses the use of polyamides, optionally in admixture with other substances, as heat stabilizers for polyoxymethylenes. A few examples of such publications are U.S. Pat. No. 3,406,223, FR-A 1,570,281, and U.S. Pat. No. 3,480,694. JP-OS 51/17,972 describes polyoxymethylenes which are thermally stabilized with aromatic polyamides and which become somewhat discolored during fabrication and show a slight tendency to foam. EP-A 47,529 describes stabilized polyoxymethylene molding materials in which the stabilizing agent is a polyamide dispersed in a carrier resin.

All of the products thus stabilized show improved thermal stability over polyoxymethylene not containing said additives, but they are still not entirely satisfactory.

GB-A 1,197,842 describes aqueous emulsions of polyamide and polyoxymethylene for use as coating materials or adhesives. However, their overall properties are inadequate for use as materials for fabrication purposes. The molding materials described in JP 61,069-859-A and composed of polyoxymethylene, Phenoxy ®, and a polyester-type thermoplastic elastomer suffer from the same drawback.

It is thus an object of the invention to provide thermoplastic molding materials based on polyoxymethylene and polyamide which show a wellbalanced range of properties, particularly as regards thermal stability, rigidity, toughness, water absorption, and surface properties such as printability, adhesion properties, coatability, write-on properties, and their capability of being electroplated.

According to the invention, this object is achieved by the thermoplastic molding materials defined above and claimed in claim 1.

The molding materials of the invention contain, as component A), from 2 to 97.5% w/w and preferably from 5 to 97% w/w of a homopolymer or copolymer of polyoxymethylene.

Such polymers are known to the person skilled in the art and are described in the literature.

Generally speaking, these polymers contain at least 50% molar of recurring —$CH_2O$— units in the main polymer chain.

The homopolymers are generally produced by polymerization of formaldehyde or trioxan, preferably in the presence of suitable catalysts.

It is preferred, within the scope of the invention, to use, as component A), polyoxymethylene copolymers, especially those which contain, in addition to the recurring —$CH_2O$— units, up to 50% molar and preferably from 0.1 to 20% molar and more preferably from 0.3 to 10% molar, of recurring units of the formula

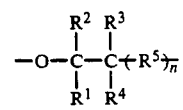

in which $R^1$ to $R^4$ independently stand for a hydrogen atom, a $C_1$-$C_4$-alkyl group, or a halo-alkyl group of from 1 to 4 carbon atoms, and $R^5$ denotes a —$CH_2$— group, a —$CH_2O$— group, a $C_1$-$C_4$-alkyl group, or a methylene group substituted by a halo-alkyl group of from 1 to 4 carbon atoms, or an oxymethylene group similarly substituted, and n is a value ranging from 0 to 3. These groups can be advantageously introduced into the copolymers by ring opening cyclic ethers. Preferred cyclic ethers are those of the formula

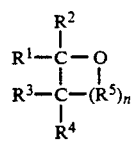

in which $R^1$ to $R^5$ and n have the meanings stated above. A few examples of such cyclic ethers are ethylene oxide, 1,2-propylene oxide, 1,2-butylene oxide, 1,3-butylene oxide, 1,3-dioxan, 1,3-dioxolane, and 1,3-dioxepane, and some examples of said comonomers are linear oligoformals and polyformals such as polydioxolane and polydioxepane.

Also suitable as component A) are oxymethylene terpolymers formed, for example, by reacting trioxan and one of the aforementioned cyclic ethers with a third monomer, preferably a difunctional compound of the formula

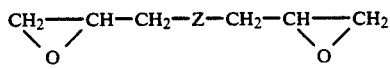

in which Z stands for a chemical bond or for —O— or —ORO— (where R denotes $C_1$-$C_8$-alkylene or $C_2$-$C_8$-cycloalkylene).

Preferred monomers of this kind are ethylene diglycide, diglycidyl ether, and diethers of glycidylene and formaldehyde, dioxan, or trioxan in a molar ratio of 2:1, and diethers of 2 moles of glycidyl compound and 1 mole of an aliphatic diol of from 2 to 8 carbon atoms such as the diglycidyl ethers of ethylene glycol, butane- 1,4-diol, butane-1,3-diol, cyclobutane-1,3-propane-1,2-diol, and cyclohexane-1,4-diol, to mention a few examples.

Methods of preparing the aforementioned homopolymers and copolymers are known to the person skilled in the art and are described in the literature, so that no detailed description thereof is necessary here.

The preferred polyoxymethylene copolymers have melting points of at least 150° C. and molecular weights (weight average) $M_w$ ranging from 5,000 to 200,000, preferably from 7,000 to 150,000.

End-group-stabilized polyoxymethylene copolymers having C—C bonds at the chain ends are particularly preferred.

The polyamides suitable for use as component B) are known per se. Semicrystalline or amorphous resins having a molecular weight of at least 5,000, such as are described in *Encyclopedia of Polymer Science and Engineering* Vol. 11, pp. 315 to 489, John Wiley & Sons, Inc. 1988, may be used.

Examples thereof are polyhexamethylene adipamide, polyhexamethylene azelamide, polyhexamethylene sebacamide, polyhexamethylene dodecanodiamide, poly-11-amino undecanamide, and bis(p-aminocyclohexyl)methane dodecanodiamide, or products obtained by ring opening lactams, for example polycaprolactam and polydodecanolactam. Also suitable are polyamides based on terephthalic or isophthalic acid as the acid component and/or on trimethylhexamethylene diamine or bis(p-aminocyclohexyl)propane as the diamine component, and polyamide-based resins formed by copolymerizing two or more of the aforementioned polymers or their components. An example thereof is a co-polycondensate of terephthalic acid, isophthalic acid, hexamethylene diamine, and caprolactam.

The manufacture of these polyamides is also described in the above citation. The ratio of terminal amine groups to terminal acid groups may be controlled by varying the molar ratio of the starting compounds.

The proportion of polyamide in the molding material of the invention is from 2 to 97.5% w/w and preferably from 5 to 95% w/w.

The co-use of a polycondensate of 2,2-di(4-hydroxyphenyl)propane (bisphenol A) and epichlorohydrin (component C) can produce a marked improvement in the dispersibility of the polyamides used.

The component C) is used in a concentration of from 0.5 to 25% w/w and preferably from 1 to 15% w/w.

The said polyamides, polyoxymethylene, and condensates of epichlorohydrin and bisphenol A are all commercially available. Processes for the preparation thereof are known to the person skilled in the art. Trade names of the polycondensates are Phenoxy ® (Union Carbide Corporation) and Epikote ® (Shell). The molecular weight of the polycondensates can be varied within wide limits. Basically, all of the commercially available products are suitable.

The thermoplastic molding compositions of the invention contain, as component D), from 0 to 60% w/w and preferably from 0 to 40% w/w of an impact modifier (also referred to below as 'rubber' or 'elastomer').

Preferred elastomer types are the so-called ethylene-propylene (EPM) rubbers and ethylene-propylene-diene (EPDM) rubbers.

EPM rubbers are generally virtually devoid of double bonds, whilst EPDM rubbers may have from 1 to 20 double bonds per 100 carbon atoms.

Examples of suitable diene monomers for EPDM rubbers are conjugated dienes such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene, and octa-1,4-diene, cyclic dienes such as cyclopentadiene, cyclohexadienes, cyclooctadienes, and dicyclopentadiene, and also alkenylnorbornenes such as 5-ethylidene-2-norbornene, 5-butylidene-2-norbornene, 2-methallyl-5-norbornene, 2-isopropenyl-5-norbornene, and tricyclodienes such as 3-methyl-tricyclo(5.2.1.0.2.6)-3,8-decadiene, and mixtures thereof. The preferred diene monomers are hexa-1,5-diene, 5-ethylidene-2-norbornene, and dicyclopentadiene. The diene content of the EPDM rubbers is preferably from 0.5 to 50% w/w and more preferably from 1 to 8% w/w, based on the total weight of the rubber.

The EPM and EPDM rubbers preferably have reactive carboxylic acids or derivatives thereof grafted thereto, examples being acrylic acid, methacrylic acid, and their derivatives, and also maleic anhydride.

Another group of preferred rubbers comprises copolymers of ethylene with acrylic acid and/or methacrylic acid and/or esters of these acids. In addition, the rubbers may contain dicarboxylic acids such as maleic acid and fumaric acid or derivatives of said acids such as their esters or anhydrides, and/or epoxy-group-containing monomers. These dicarboxylic acid derivatives or epoxy-group-containing monomers are preferably incorporated in the rubber by adding said dicarboxylic monomers or epoxy-group-containing monomers of the general formula I or II or III or IV to the mixture of monomers:

(I)

(II)

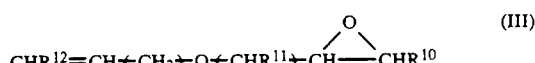

(III)

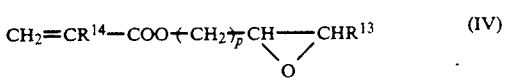

(IV)

in which $R^6$ to $R^{14}$ denote hydrogen or an alkyl group of from 1 to 6 carbon atoms and m stands for an integer from 0 to 20, g for an integer from 0 to 10 and p for an integer from 0 to 5.

Preferably, the radicals $R^6$ to $R^{12}$ are hydrogen atoms, m being equal to 0 or 1 and g to 1. This gives the compounds maleic acid, fumaric acid, maleic anhydride, allylglycidyl ether, and vinylglycidyl ether.

The preferred compounds of formulae I, II, III and IV are maleic acid, maleic anhydride and epoxy-group-containing esters of acrylic and/or methacrylic acids, for example glycidyl acrylate, glycidyl methacrylate, and esters with tertiary alcohols, such as t-butyl acrylate. Although the latter have no free carboxyl groups, they behave in a manner very similar to the free acids and are therefore referred to as monomers containing latent carboxyl groups.

Advantageously, the copolymers are composed of from 50 to 98% w/w of ethylene, from 0.1 to 20% w/w of epoxy-group-containing monomers and/or methacrylic acid and/or acid-anhydride-group-containing monomers, the remainder being acrylates or methacrylates.

Particularly preferred copolymers are those composed of from 50 to 98% w/w, preferably 55 to 95% w/w, of ethylene, from 0.1 to 40% w/w, preferably from 0.3 to 20% w/w, of glycidyl acrylate and/or glycidyl methacrylate, (meth)acrylic acid, and/or maleic anhydride, and from 1 to 45% w/w, preferably from 10 to 40% w/w, of n-butyl acrylate and/or 2-ethylhexyl acrylate.

Other preferred esters of acrylic and/or methacrylic acid are the methyl, ethyl, propyl, isobutyl, and t-butyl esters.

In addition, vinyl esters and vinyl ethers may be used as comonomers.

The aforementioned ethylene copolymers can be produced by processes known per se, preferably by random copolymerization under high pressure and at elevated temperature, as generally known in the art.

Other preferred elastomers are emulsion polymers produced as described, for example, by Blackley in "Emulsion Polymerization". The emulsifiers and catalysts which can be used are known per se.

Basically, elastomers of a homogeneous structure or elastomers having a shell structure can be used. The shell structure is determined by the order in which the individual monomers are added. The morphology of the polymers is also dependent on the order of monomer addition.

As monnomers suitable for the production of the rubber moiety of the elastomers there may be mentioned, by way of example only, acrylates such as n-butyl acrylate and 2-ethylhexyl acrylate, the corresponding methacrylates, butadiene, isoprene, and mixtures thereof. These monomers can be copolymerizd with other monomers, for example styrene, acrylonitrile, vinyl ethers and other acrylates and methacrylates, such as methyl methacrylate, methyl acrylate, ethyl acrylate, and propyl acrylate.

The soft or rubber phase (having a glass transition temperature below 0° C.) of the elastomers may form the core, the outer shell, or (in the case of elastomers containing more than two shells) an intermediate shell.

Alternatively, multishell elastomers may contain a number of shells consisting of a rubbery phase.

If the elastomers contain, in addition to the rubbery phase, one or more hard components (having a glass transition temperature above 20° C.), these are generally produced by polymerization of styrene, acrylonitrile, methacrylonitrile, α-methylstyrene, p-methylstyrene, and acrylates and methacrylates such as methyl acrylate, ethyl acrylate, and methyl methacrylate, as the main monomers. Here again, small portions of other comonomers may be incorporated if desired.

In some cases it has been found advantageous to use emulsion polymers which have active groups on their surface. Groups of this kind are, for example, epoxy groups, carboxyl groups, latent carboxyl groups, amino groups, amide groups, and functional groups, which can be incorporated by the co-use of monomers of the general formula

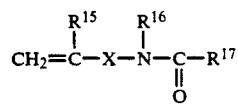

in which the substituents can have the following meanings:

$R^{15}$ hydrogen or a $C_1$-$C_4$-alkyl group, $R^{16}$ hydrogen, a $C_1$-$C_8$-alkyl group, or an aryl group, preferably phenyl, $R^{17}$ hydrogen, a $C_1$-$C_{10}$-alkyl group, a $C_6$-$C_{12}$-aryl group, or —O—$R^{18}$, $R^{18}$ a $C_1$-$C_8$-alkyl or a $C_6$-$C_{12}$-aryl group optionally substituted by groups containing oxygen or nitrogen, X a chemical bond, a $C_1$-$C_{10}$-alkylene group, a $C_6$-$C_{12}$-arylene group, or a group of the formula

in which
Y is O—Z or NH—Z, where
Z is a $C_1$-$C_{10}$-alkylene group or a $C_6$-$C_{12}$-arylene group.

The graft monomers described in EP-A 208,187 are also suitable for introducing surface active groups.

Further examples which may be mentioned are acrylamide, methacrylamide, and substituted esters of acrylic acid or methacrylic acid, such as (N-t-butylamino)ethyl methacrylate, (N,N-dimethylamino)ethyl acrylate, (N,N-di-methylamino)methyl acrylate and (N,N-diethylamino)ethyl acrylate.

In addition, the particles of the rubbery phase may be cross-linked if desired. Examples of monomers acting as cross-linking agents are buta-1,3-diene, divinylbenzene, diallyl phthalate, dihydrodicyclopentadienyl acrylate, and the compounds described in EP-A 50,265.

It is also possible to use graft-linking monomers, ie monomers having two or more polymerizable double bonds which react at different rates during polymerization. It is preferred to use compounds in which at least one of the active groups polymerizes at approximately the same rate as the other monomers, whilst the other active group(s) may polymerize at, say, a much slower rate. A certain proportion of unsaturated double bonds in the rubber is the result of these different rates of polymerization. When a further phase is grafted to such a rubber, some, at least, of the double bonds present in the rubber react with the graft monomer to form chemical bonds, ie the grafted phase is at least partly linked to the graft base via chemical bonds.

Examples of such graft-linking monomers are allyl-group-containing monomers, especially allyl esters of ethylenically unsaturated carboxylic acids, eg allyl acrylate, allyl methacrylate, diallyl maleate, diallyl fumarate, diallyl itaconate, and the corresponding monoallyl derivatives of said dicarboxylic acids. There are many more graft-linking monomers which are suitable, for details of which reference is made to U.S. Pat. No. 4,148,846.

In general, the amount of said graft-linking monomers in component D) is not more than 5% w/w and preferably not more than 3% w/w, based on D).

The following is a list of some of the preferred emulsion polymers. The first items are graft polymers having a core and at least one outer shell, structured as follows:

| Type | Core Monomers | Shell Monomers |
|------|---------------|----------------|
| I | buta-1,3-diene, isoprene, n-butyl acrylate, ethylhexyl acrylate, or mixtures thereof | styrene, acrylonitrile, methyl methacrylate |
| II | as I but with the addition of cross-linkers | as I |
| III | as I or II | n-butyl acrylate, ethyl acrylate, methyl acrylate, buta-1,3-diene, isoprene, ethylhexyl acrylate |
| IV | as I or II | as I or III but with the addition of monomers containing active groups as described above |
| V | styrene, acrylonitrile, methyl methacrylate, or mixtures thereof | first shell composed of core monomers as listed under I and II second shell composed of shell monomers as listed under I and III |

Instead of graft polymers having a number of shells, use may be made of homogeneous elastomers, i.e. polymers having only one shell of, say, buta-1,3-diene, isoprene, and n-butyl acrylate, or copolymers thereof. Again, these products may be formed with the addition of cross-linking monomers or monomers containing active groups, if desired.

Examples of preferred emulsion polymers are n-butyl acrylate/(meth)acrylic acid copolymers, n-butyl acrylate/glycidyl (meth)acrylate copolymers, graft polymers having a core of n-butyl acrylate or a butadiene-based core and an outer shell of the aforementioned copolymers and copolymers of ethylene with comonomers providing active groups.

Alternatively, the said elastomers D) may be prepared by other conventional methods, for example by suspension polymerization.

Other preferred rubbers are polyurethanes such as are described in EP-A 115,846, EP-A 115,847, EP-A 116,456, EP-A 117,664, and EP-A 327,384. Such products are commercially available, for example under the trade name Desmopan ® (Bayer AG) or Elastollan ® (Elastogran Polyurethane GmbH).

It is of course possible to use mixtures of the aforementioned types of elastomer.

The molding materials of the invention may contain, as component E), from 0 to 60% w/w, preferably from 5 to 40% w/w, of a fibrous and/or particulate filler.

Examples of reinforcing fillers are potassium titanate whiskers, carbon fibers, and, preferably, glass fibers, the latter being in the form of, say, glass cloths, glass mats, glass felts, and/or glass fiber rovings or chopped glass strands of low-alkali E-glass and having a diameter of from 5 to 200 μm, preferably from 8 to 50 μm, the average length of the fibers in said filler being, after incorporation thereof in the molding material, preferably from 0.05 to 1 mm and more preferably from 0.1 to 0.5 mm.

Other suitable fillers are, for example, wollastonite, calcium carbonate, glass spheres, quartz powder, silicon nitride, boron nitride, or mixtures of such fillers.

Besides the components A), B), and C), and possibly D) and E), the molding materials of the invention may also contain conventional additives and processing aids. The following are mentioned by way of example: formaldehyde scavengers, plasticizers, lubricants, antioxidants, adhesion promoters, fillers, light stabilizers, and pigments. The concentration of such additives generally ranges from 0.001 to 5% w/w (in the case of stabilizers, pigments, and lubricants) or from 5 to 40% w/w (in the case of fillers).

Such additives are known to the person skilled in the art and are described in, for example, EP-A 327,384.

The thermoplastic molding materials of the invention are prepared by known methods, for which reason no detailed description of their manufacture is necessary here. The preferred procedure is to melt the polyamide, optionally together with the rubber and the condensate of bisphenol A and epichlorohydrin, after which the melt is mixed with the polyoxymethylene and the resulting mixture extruded and granulated.

The thermoplastic molding materials of the invention are distinguished by a well-balanced range of properties, particularly as regards their thermal stability, rigidity, toughness, and surface properties, and their low intake of water. They are thus particularly well suited for the manufacture of all kinds of shaped articles.

EXAMPLES

The following components were used:

A Polyoxymethylene copolymer prepared from trioxan and from 2.5 to 3% w/w of butanediolformal, based on the total monomers [Ultraform ® S 2320 (Ultraform GmbH)] having a melt flow index of 13 g/10 min (190° C./2.16 kg)

B/1 Polyhexamethylene sebacamide [Ultramid ® S3 (BASF AG)] having a viscosity number of 143 ml/g (as measured on a 0.5% w/w solution in 96% w/w strength H$_2$SO$_4$ at 25° C.).

B/2 Poly-ε-caprolactam [Ultramid ® B3 (BASF AG)] having a viscosity number of 150 ml/g (as measured on a 0.5% w/w solution in 96% w/w strength H$_2$SO$_4$ at 25° C. to the specification of DIN 53,727)

B/3 Poly-ε-caprolactam [Ultramid ® BS 400 S (BASF AG)] having a molecular weight (number average) of 14,000

B/4 Copolyamide of Nylon 6 (poly-ε-caprolactam) and Nylon 66 (polyhexamethylene adipamide) in a ratio of 85:15 w/w [Ultramid ® C35 (BASF AG)] having a viscosity number of 178 ml/g (as measured on a 0.5% w/w solution in 96% w/w strength H$_2$SO$_4$ at 25° C.)

C Condensate of bisphenol A and epichlorohydrin [Phenoxy ® PKHH (UCC)]

D/1 59.5:35:5:0.5 w/w ethylene/butyl acrylate/acrylic acid/maleic anhydride copolymer having a melt flow index of 10 g/10 min (as measured at 190° C. under a load of 216 kg as specified in DIN 53,735)

D/2 Ethylene/propylene copolymer grafted with 0.8 w/w of maleic anhydride [Exxelor ®1803 (Exxon Chemical Comany)]

EXAMPLES 1 to 9

Using a twin extruder (Werner & Pfleiderer ZSK 30), starting products are formed from polyamide (component B), Phenoxy ® (component C) and rubber (component D). The polyoxymethylene (component A) was melted in a separate extruder and fed to the starting product from the side. After mixing, the combined extrudate was cooled and granulated.

COMPARATIVE EXAMPLES C1 TO C9

Examples 1 to 9 were repeated except that no Phenoxy ® was added.

COMPARATIVE EXAMPLE C10

Only polyoxymethylene was used.

The compositions and properties of the blends are listed in the Table below.

The notched impact strength ($a_k$) was determined at 23° C. as specified in DIN 53,453, the ultimate tensile strength ($\sigma_R$) at 23° C. as specified in DIN 53,455, and the elongation at break ($\epsilon_R$) at 23° C. as specified in DIN 53,455. The 50% damaging energy ($W_{50}$) was determined on 2 mm thick discs having a diameter of 60 mm using a falling dart having a diameter of 20 mm, as specified in DIN 53,443.

TABLE

| Ex. No. | A | B/1 | B/2 | B/3 | B/4 | C | D/1 | D/2 | $a_k$ (kJ/m$^2$) | $\sigma_R$ (N/mm$^2$) | $\epsilon_R$ (%) | $W_{50}$ (J) |
|---|---|---|---|---|---|---|---|---|---|---|---|---|
| 1 | 75 | 10.5 | — | — | — | 10 | — | 4.5 | 6 | 52 | 23 | 30 |
| 2 | 60 | 21.0 | — | — | — | 10 | — | 9.0 | 11 | 51 | 23 | — |
| 3 | 45 | 31.5 | — | — | — | 10 | — | 13.5 | 31 | 47 | — | 29 |
| 4 | 60 | 21.0 | — | — | — | 10 | 9 | — | 12 | 47 | 41 | 18 |
| 5 | 60 | — | — | 24 | — | 10 | 6 | — | 8 | 54 | 16 | 5 |
| 6 | 60 | — | — | 21 | — | 10 | 9 | — | 10 | 49 | 25 | 9 |
| 7 | 60 | — | — | 15 | — | 10 | 15 | — | 14 | 39 | 33 | 26 |
| 8 | 60 | — | 24 | — | — | 10 | 6 | — | 10 | 54 | 21 | 7 |
| 9 | 45 | — | — | — | 31.5 | 10 | — | 13.5 | 37 | 43 | 15 | 35 |
| C1 | 85 | 10.5 | — | — | — | — | — | 4.5 | 2 | 43 | 8 | <1 |
| C2 | 70 | 21.0 | — | — | — | — | — | 9.0 | 4 | 34 | 3 | <1 |
| C3 | 55 | 31.5 | — | — | — | — | — | 13.5 | 4 | 23 | 2 | <1 |
| C4 | 70 | 21.0 | — | — | — | — | 9 | — | 3 | 45 | 9 | <1 |
| C5 | 70 | — | — | 24 | — | — | 6 | — | 3 | 41 | 11 | <1 |
| C6 | 70 | — | — | 21 | — | — | 9 | — | 3 | 35 | 14 | <1 |
| C7 | 70 | — | — | 15 | — | — | 15 | — | 3 | 23 | 23 | 5 |
| C8 | 70 | — | 24 | — | — | — | 6 | — | 3 | 36 | 10 | <1 |
| C9 | 55 | — | — | — | 31.5 | — | — | 13.5 | 3 | 37 | 3 | 1.6 |
| C10 | 100 | — | — | — | — | — | — | — | 4 | 55 | 29 | <1 |

We claim:

1. A thermoplastic molding material based on
   A) from 2 to 97.5% w/w of a homopolymer or copolymer of polyoxymethylene
   B) from 2 to 97.5% w/w of a polyamide
   C) from 0.5 to 25% w/w of a polycondensate of 2,2-di(4-hydroxyphenyl)propane and epichlorohydrin
   D) from 0 to 60% w/w of an impact modifier, and
   E) from 0 to 60% w/w of fibrous or particulate fillers or mixtures thereof.

2. A molded article prepared from the thermoplastic molding material of claim 1.

3. The thermoplastic molding material of claim 1 wherein the polycondensate component C) is present in an amount of from 1 to 15% w/w.

* * * * *